(12) United States Patent
Beauchesne-Martel et al.

(10) Patent No.: US 11,619,139 B1
(45) Date of Patent: Apr. 4, 2023

(54) METHOD AND SYSTEM FOR DETECTING A SHAFT SHEAR EVENT

(71) Applicant: PRATT & WHITNEY CANADA CORP., Longueuil (CA)

(72) Inventors: Philippe Beauchesne-Martel, Brossard (CA); Jeremie Hebert, Sherrington (CA); Pramuk Fernando, Vaudreuil-Dorion (CA); Jasraj Chahal, Lasalle (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/592,969

(22) Filed: Feb. 4, 2022

(51) Int. Cl.
| | |
|---|---|
| F01D 17/04 | (2006.01) |
| F01D 21/06 | (2006.01) |
| F02C 9/28 | (2006.01) |
| F01D 21/04 | (2006.01) |
| F02D 35/02 | (2006.01) |
| G01B 7/16 | (2006.01) |
| G01B 21/32 | (2006.01) |
| F16C 3/02 | (2006.01) |

(52) U.S. Cl.
CPC ........... *F01D 17/04* (2013.01); *F01D 21/045* (2013.01); *F01D 21/06* (2013.01); *F02C 9/28* (2013.01); *F02D 35/02* (2013.01); *F16C 3/02* (2013.01); *G01B 7/16* (2013.01); *G01B 21/32* (2013.01); *F05D 2260/80* (2013.01); *F16C 2233/00* (2013.01); *F16C 2360/23* (2013.01)

(58) Field of Classification Search
CPC ... F16C 3/02; G01B 7/16; G01B 21/32; F02C 9/28; F02C 7/00; F02C 9/46; F02C 3/04; F02D 35/02; F05D 2260/80; F01D 17/04; F01D 21/045; F01D 17/06; F01D 21/06; F01D 21/00; F01D 21/003; F01D 5/02; F01D 17/02; F01D 25/162; F01D 9/065; F01D 25/28; F01D 21/04; F01D 25/243; F01D 21/02; F01D 21/08; F01D 21/14; B64D 27/10; B64D 45/00; G01C 5/00
See application file for complete search history.

(56) References Cited

U.S. PATENT DOCUMENTS

| | | | |
|---|---|---|---|
| 10,787,275 B2 * | 9/2020 | Huth | G01M 5/0041 |
| 11,371,381 B2 * | 6/2022 | Wood | F01D 21/003 |
| 2018/0045071 A1 | 2/2018 | Roach et al. | |
| 2020/0198794 A1 * | 6/2020 | Nizami | F01D 21/06 |
| 2020/0284206 A1 * | 9/2020 | McCarthy | F02C 6/02 |
| 2021/0025287 A1 * | 1/2021 | Ahmad | F01D 21/003 |

* cited by examiner

*Primary Examiner* — Todd E Manahan
*Assistant Examiner* — Rodolphe Andre Chabreyrie
(74) *Attorney, Agent, or Firm* — Norton Rose Fulbright Canada LLP

(57) ABSTRACT

The method can include: monitoring a current value of a rate of reduction of torque of the shaft; providing a threshold value for the rate of reduction of torque of the shaft; and generating a signal indicative of the shaft shear event when the current value exceeds the threshold value.

20 Claims, 12 Drawing Sheets

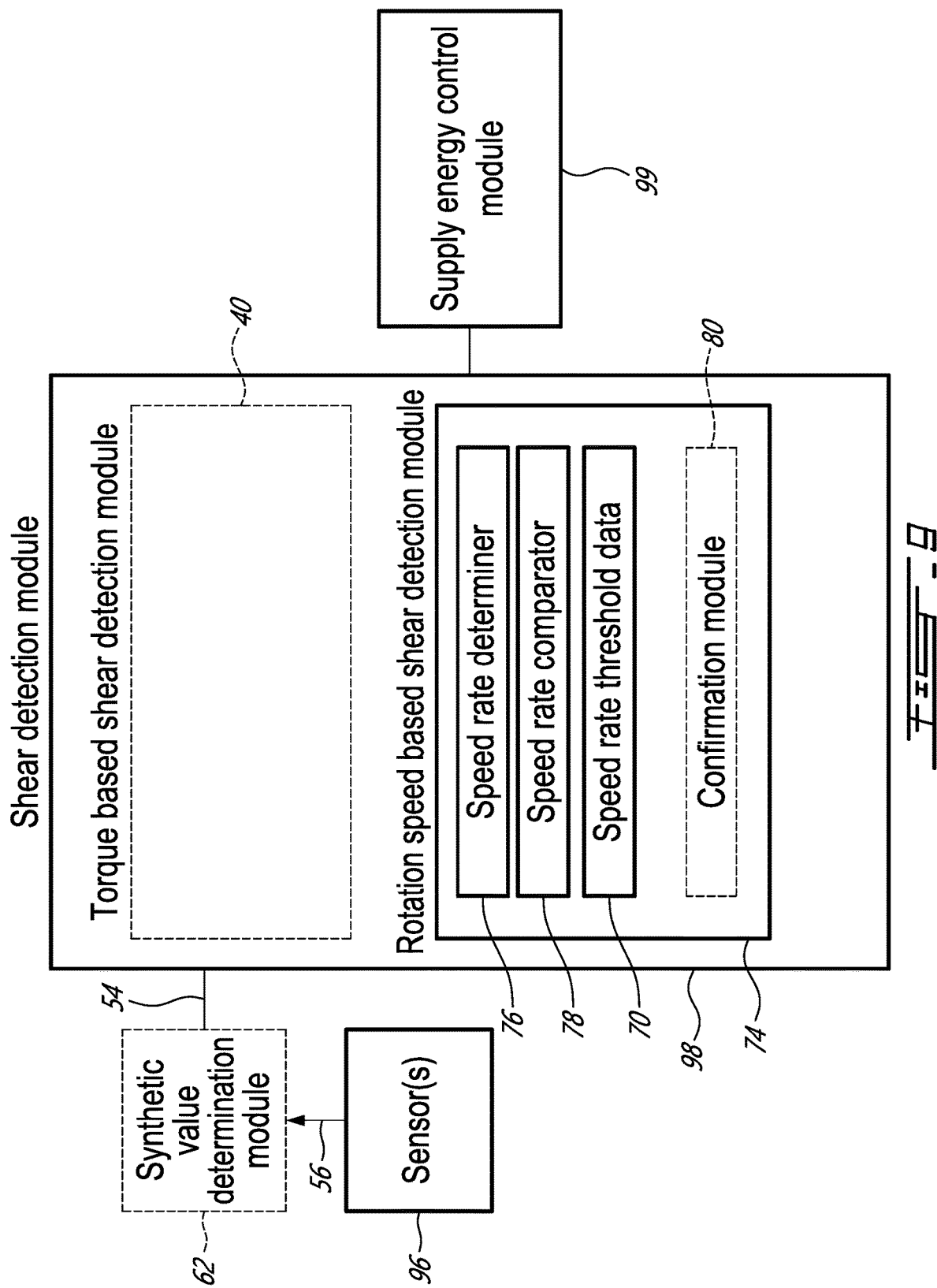

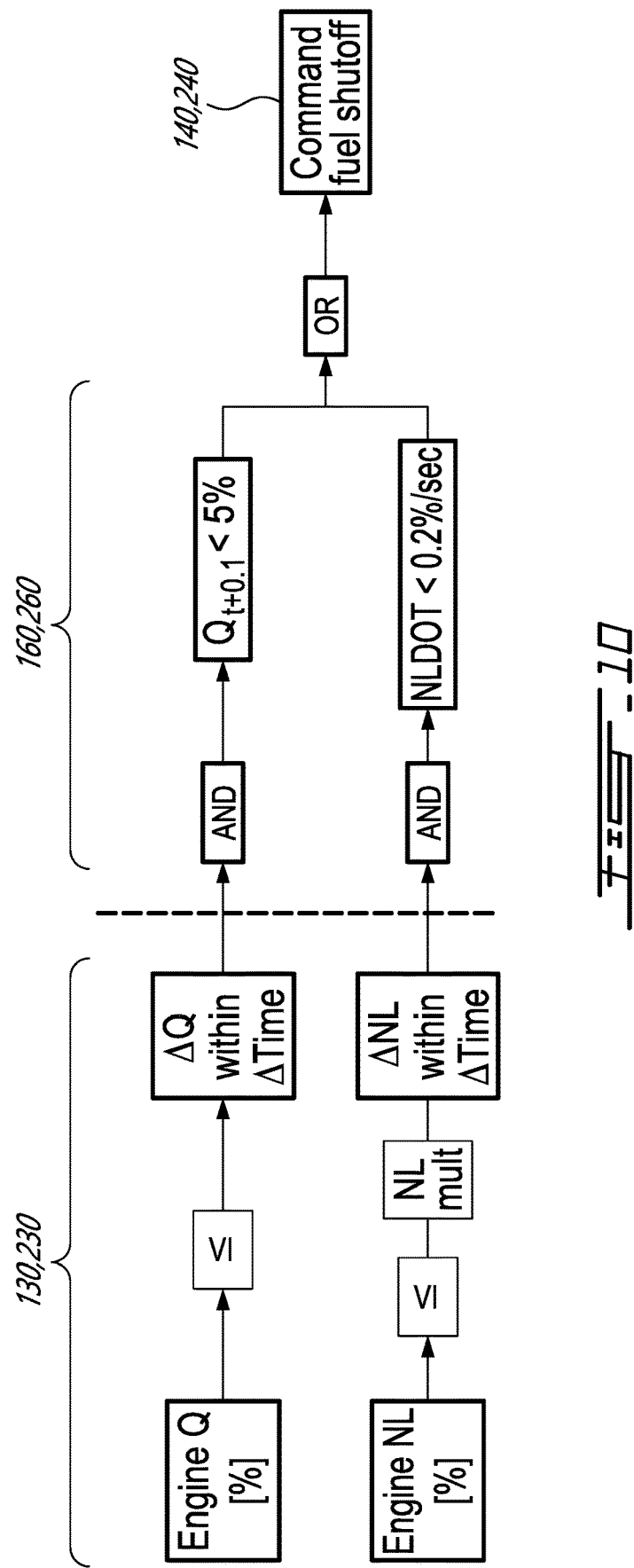

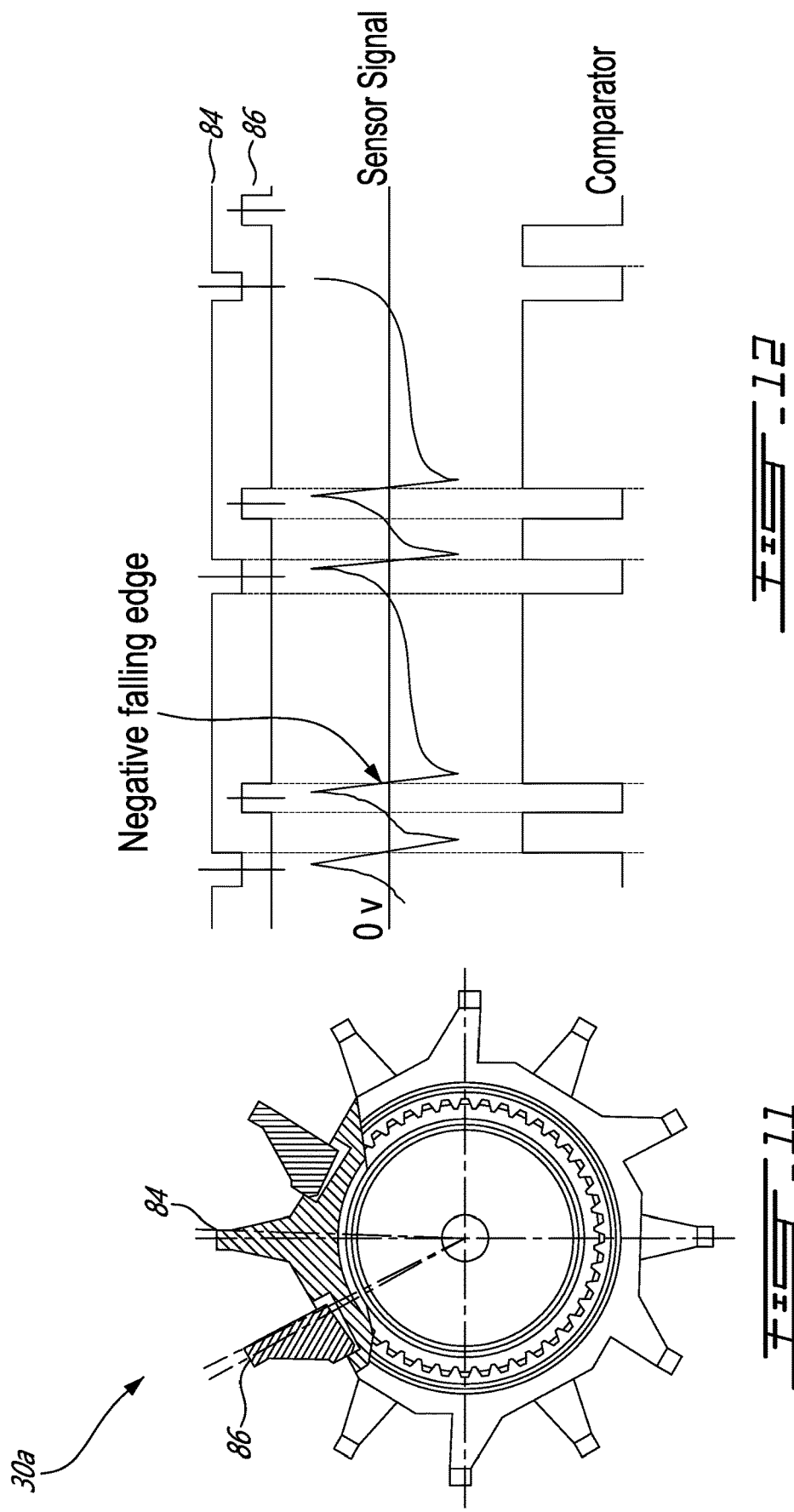

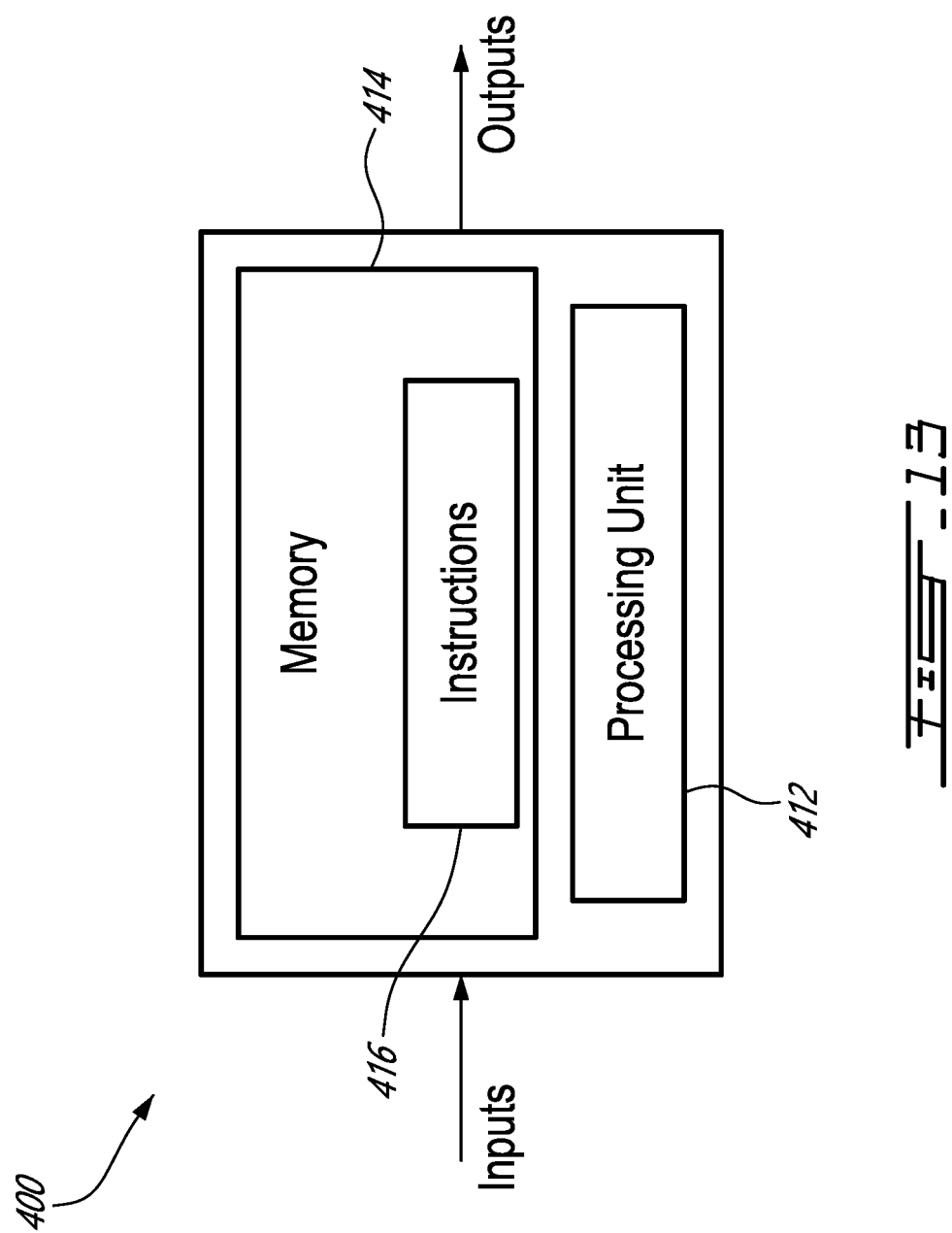

METHOD AND SYSTEM FOR DETECTING A SHAFT SHEAR EVENT

TECHNICAL FIELD

The application relates generally to aircraft engines and, more particularly, to the detection and mitigation of a shaft shear event therein.

BACKGROUND OF THE ART

On engines such as gas turbine engines, an event called 'shaft shear' refers to the shearing (breaking) of a shaft under its load. In gas turbine engines in particular, shaft shear can release the turbine portion of a spool from its load (e.g. compressor, fan, propeller, helicopter blades). Subsequently continuing to supply energy to the engine at the same rate, such as at a same fuel flow rate for instance, can lead to rotary acceleration of the turbine portion, which is undesired. Indeed, extreme acceleration of the turbine portion could lead to over-speeding, exposing the engine to a risk of turbine bursting, a phenomenon via which portions of a turbine, such as its blades or disk, can break off and become released due to excessive centripetal acceleration. Typically, the faster the turbine is rotating prior to shaft shear, the less reaction time is available to avoid over-speeding.

Shaft shear mitigation techniques have been used in the past. Shaft shear mitigation techniques typically involve a first step of acquiring an indication of shaft shear, and a second step of shutting down the engine, e.g. closing off a valve associated to a fuel supply, in reaction to the early indication of shaft shear. Shaft shear mitigation techniques are automated via controllers and sensors, and generally involve a form of computer referred to as an engine electronic controller, as they typically need to operate within a period of time too short for reliable pilot intervention. They are thus typically embodied in the form of computer implemented methods which act on the engine during operation. While turbine over-speeding can be highly undesirable, false detections of shaft shearing can be a problem as well, as anyone aboard a plane in which an engine is shut down would undoubtedly understand. While prior shaft shear mitigation techniques have been satisfactory to a certain degree, there always remains room for improvement. Indeed, each engine can have a specific configuration, including types and positions of various sensors providing a corresponding, typically imperfect, representation of current operating conditions to the engine controller, and achieving a suitable balance between attaining a suitable reaction time while minimizing any false shaft shear detection occurrences in view of a specific engine configuration is a constant source of challenge.

SUMMARY

In one aspect, there is provided a method of detecting a shaft shear event occurring at a shaft of an engine, the method comprising: during operation of the engine, at an engine controller: monitoring a current value of a rate of reduction of torque of the shaft; providing a threshold value for the rate of reduction of torque of the shaft; generating a signal indicative of the shaft shear event when the current value exceeds the threshold value.

DESCRIPTION OF THE DRAWINGS

Reference is now made to the accompanying figures in which:

FIG. 9 is a block diagram of a shear mitigation module;

FIG. 10 is a flow chart of a method of detecting shaft shear;

FIG. 11 is a cross-sectional view showing teeth of a phonic wheel sensor;

FIG. 12 is an example raw signal acquired from a phonic wheel sensor;

FIG. 13 is an example of a computer.

DETAILED DESCRIPTION

Figure 1:
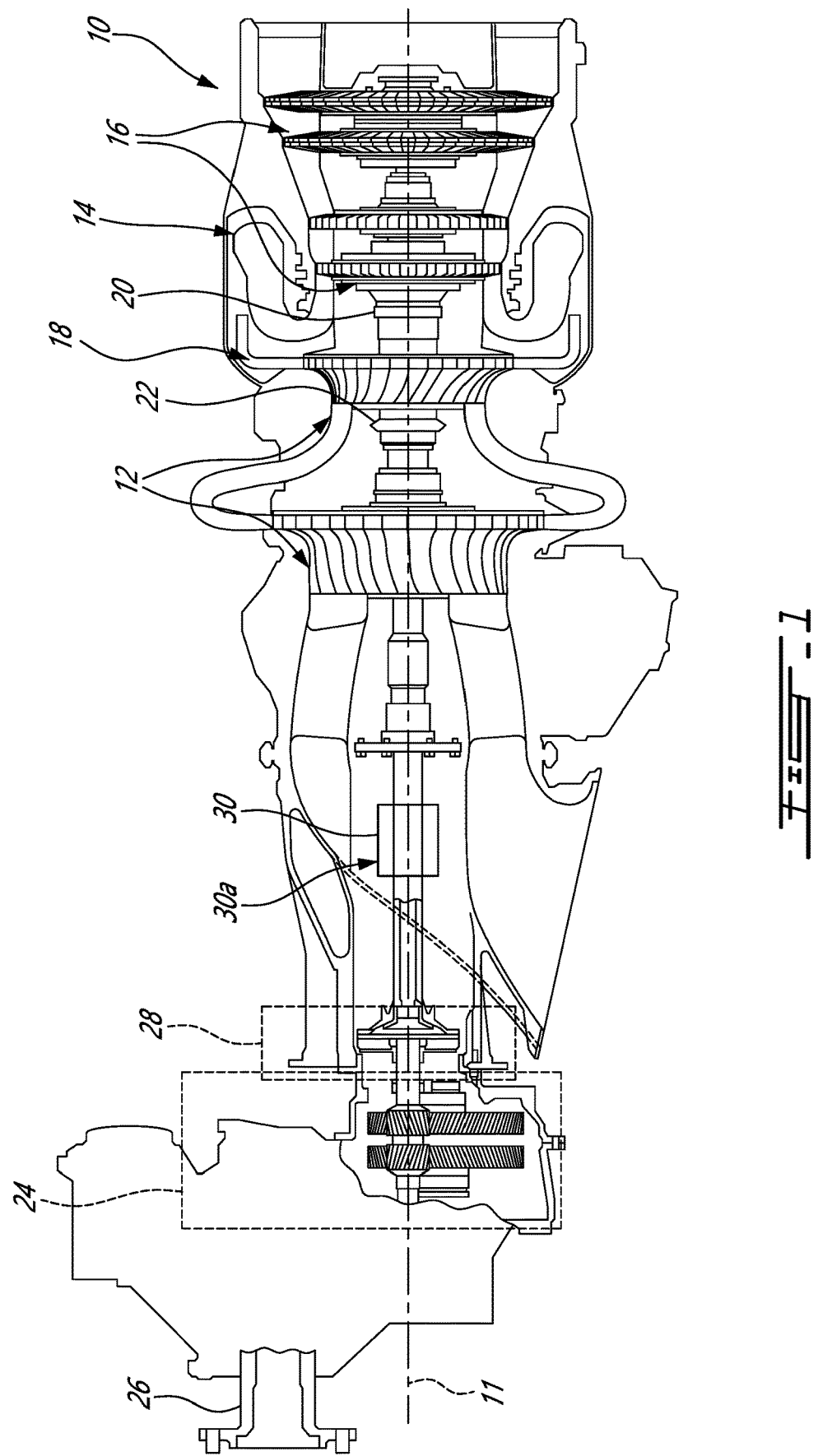
FIG. 1 is a schematic cross-sectional view of a gas turbine engine.

FIG. 1 illustrates an example of a turbine engine. In this example, the turbine engine 10 is a turboprop engine generally comprising in serial flow communication, a multistage compressor 12 for pressurizing the air, a combustor 14 in which the compressed air is mixed with fuel and ignited for generating an annular stream of hot combustion gases around the engine axis 11, and a turbine section 16 for extracting energy from the combustion gases. The turbine engine terminates in an exhaust section.

The fluid path extending sequentially across the compressor 12, the combustor 14 and the turbine 16 can be referred to as the core gas path 18. In practice, the combustor 14 can include a plurality of identical, circumferentially interspaced, combustor units. In the embodiment shown in FIG. 1, the turboshaft engine 10 has two compressor and stages, including a high pressure stage associated to a high pressure shaft 20, and a low pressure stage associated to a low pressure shaft 22. The low pressure shaft 22 is used as a power source during use.

Turboprop engines, similarly to turboshaft engines, may have some form of gearing by which the power of the low pressure shaft 22 is transferred to an external shaft 26 bearing blades or propeller. This gearing, which can be referred to as a gearbox 24 for the sake of simplicity, typically reduces the rotation speed to reach an external rotation speed which is better adapted to rotate the blades or propeller for instance. In some embodiments where gearing is present, the external shaft 26 can be offset or aligned with the main axis 11. In some engines, a clutch 28 is further present which can be used to selectively engage or disengage the low pressure shaft 22 from the load 26.

An end of a shaft which is connected to a load can be referred to as an output end. In the illustrated embodiment, the output end of the low pressure shaft 22 is located, along the length, opposite the low pressure turbine relative the low pressure compressor. In alternate embodiments, the output end of the low pressure shaft 22 can be located, along the length, opposite the low pressure compressor relative the low pressure turbine, for instance.

Figure 2:
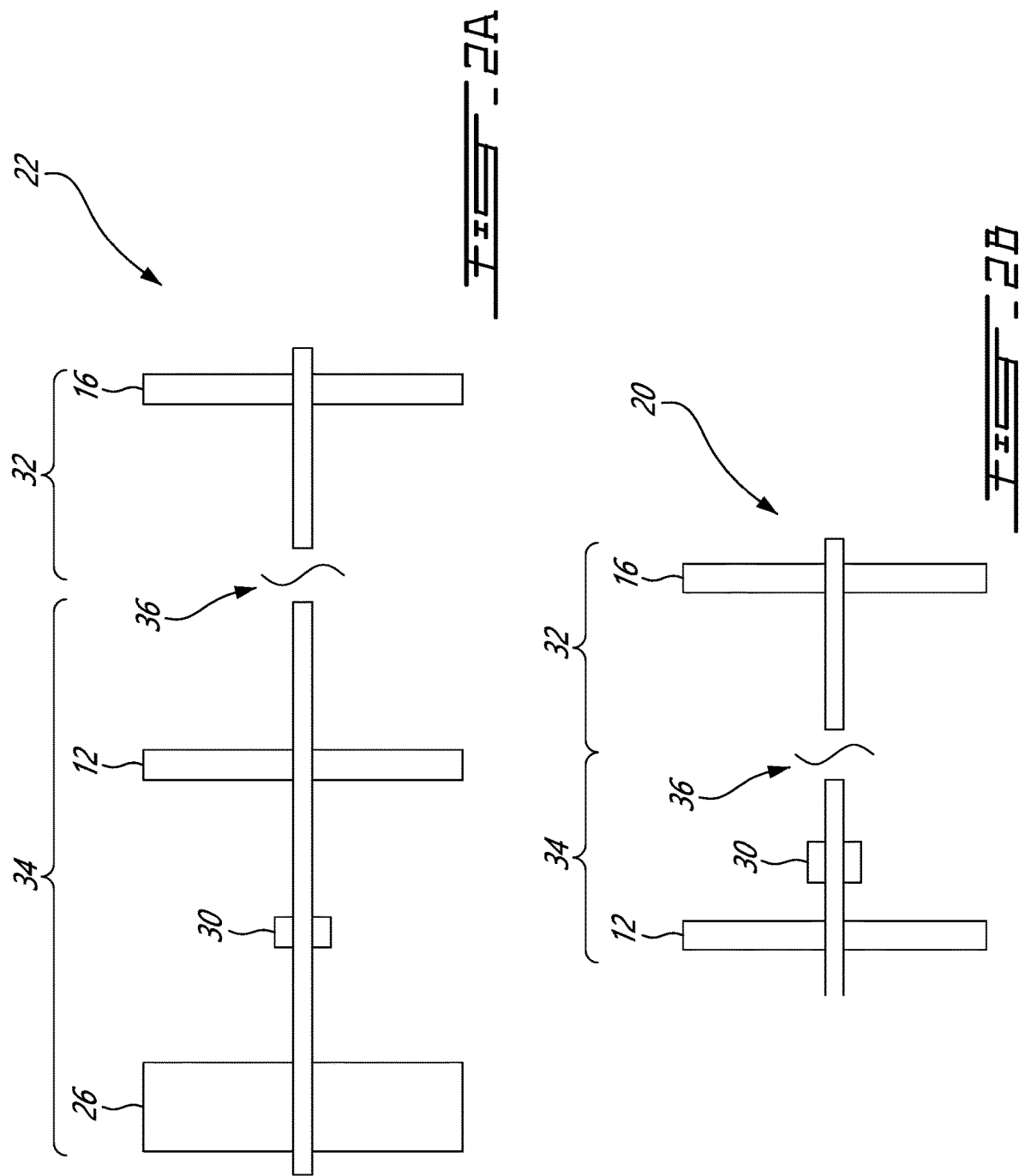
FIGS. 2A and 2B are schematic representations of a shaft shear event on a low pressure spool and on a high pressure spool, respectively, provided as examples.

A shearing event involves the breaking of a shaft such as the high pressure shaft 20 or the low pressure shaft 22 along its length, into two portions. FIG. 2A schematizes an potential shaft shear occurring between a compressor and a turbine of a low pressure shaft, while FIG. 2B schematizes a potential shaft shear occurring between a compressor and a turbine of a high pressure shaft, to provide two illustrative examples of shaft shear. It will be understood that shaft shear can also occur between a compressor and a load, such as propeller, fan, gearing, helicopter main gearbox input module or helicopter blades, for instance, in other scenarios.

In the event of the shearing of a shaft, a turbine portion 32 of the shaft 20, 22, which extends between the shear 36 and the turbine 16, becomes disconnected from a load portion 34 of the shaft 20, 22, which extends between the shear 36 and the load 26, 12 (e.g. one or more of compressor, propeller, blades, fan, depending on the exact engine configuration and nature of the shaft). Depending on the location of the shear 36, the turbine portion 16 can remain properly supported by bearings and be free to rotate independently of the load 26, 12, which may lead to over-speeding, and which can be avoided by shutting down the energy source to the engine. An automated function can be responsible for detecting the breakage and shutting down the energy source in the event of detection. Such a function can be performed by an engine controller 92 for instance.

Figure 3:
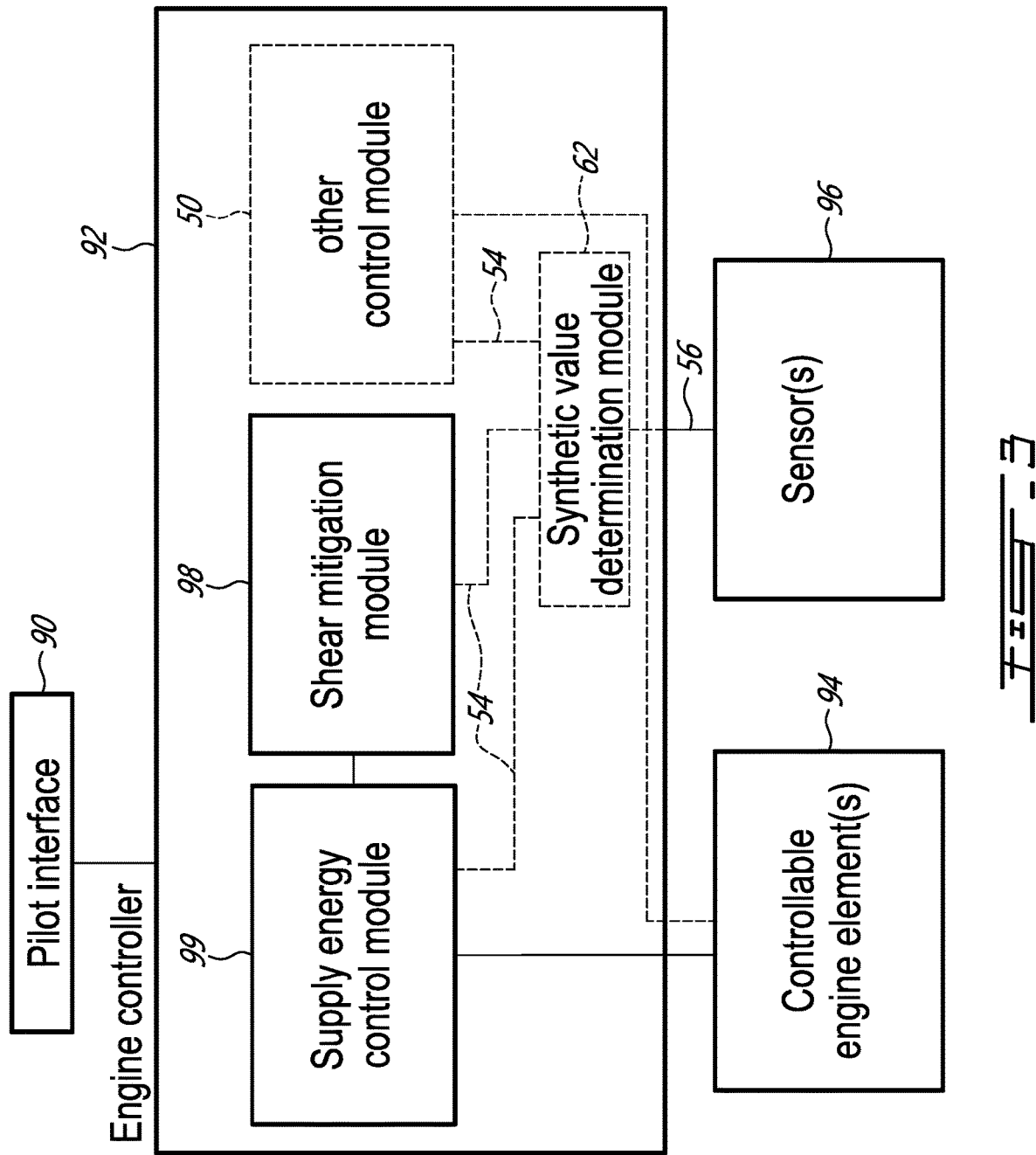
FIG. 3 is a block diagram of an aircraft control system.

FIG. 3 presents an example of an airplane control system which generally includes an engine controller 92, a pilot interface 90 configured for allowing the pilot(s) to interact with the engine controller 92, controllable engine elements 94 (e.g. fuel flow rate control valve, variable geometry element(s)), and sensors 96 some of which can be incorporated directly within the engine or elsewhere on the aircraft, which can be a source (e.g. engine controller input) of current values of various monitored parameters which can affect the control of the controllable engine elements 94.

An example engine controller 92 can be embodied as a centralized computing unit or distributed in the form of a plurality of physical computing units. A plurality of physical computing units can be configured to communicate with one another and to share physical resources such as memory or computing power for instance. Various modifications are possible.

An example engine controller 92 can have a plurality of functions associated to engine control. From a programming and design point of view, it can be convenient to refer to such different functions, or group of related ones of such different functions, as "modules" or "control units", somewhat independently of, i.e. abstracted from, the details of the physical, hardware implementation ultimately retained in view of a specific embodiment. Accordingly, in this specification, a shear mitigation module 98 can be defined as including a function of detecting shaft shear for a shaft of the engine 10 for instance, or functions associated to detecting shaft shear of corresponding, different shafts 20, 22 of the engine 10 for instance. In some embodiments, such a shaft shear mitigation module 98 can further be responsible for controlling shutting down the engine in the event of shaft shear detection, such as by directly controlling a fuel control valve, or indirectly, by sending a signal to a fuel control module 99, for instance. Such a shear mitigation module 98 can be configured for executing automated control functions based on inputs such as sensor input (current values of monitored parameters). The functions can be implemented as instructions stored in a computer readable memory, and configured to direct the computer to perform the associated function(s) when executed upon by a processor.

In practice, a limited representation of the current operating conditions can be acquired via one or more sensors 96 (such as sensor 30) and made available to the engine controller 92. The sensors 96 can produce corresponding signals which can be associated to values of measured parameters, a process which may be based on prior calibration in some or all cases. In some cases a measured parameter value 56 can be used directly as a monitored parameter value 54 the engine controller 92, whereas in other cases they can be used to produce synthetic parameters which, in turn, can be used as monitored parameter values 54 by the engine controller 92. Either one or both measured parameters values 56 and synthetic parameters can form a set of monitored parameters 54 which are used by the shear mitigation module 98 to acquire information about current operating conditions (current values of monitored parameters). Such sensors 96 can include more than one type of sensor, such as pressure, temperature, (rotation) speed and torque sensors for instance, and more than one sensor of the same type associated to different points along the main gas path and/or to different components of the gas turbine engine (e.g. a torque sensor can be integrated to an engine shaft).

In some cases, a measured value 56 can be used directly as a monitored value 54, whereas in other cases, one or more value of a measured parameter 56 can be used as the basis of determining a value of a synthetic parameter which is then used as a monitored value 54. A given measured value 56 can also be used both directly and as the basis of determining a synthetic value. The process or processes of forming one or more synthetic value based on one or more measured value can be considered to form part of a synthetic value determination module 62 for instance.

In some cases, a monitored parameter value 54 can be synthesized from one or more other measured parameter values 56, and potentially using one or more other synthesized parameter value, by calculation, i.e. using one or more equation as well as in some cases information about the engine which will collectively be referred to herein as characteristics data for simplicity of reference. Characteristics data can be provided by the designer for instance, and can be based on computer assisted simulation, test results, etc.

A somewhat simple example of a synthesized parameter value can be a synthesized pressure measurement value. Indeed, in a gas turbine engine, if pressure is measured at one point, together with other key measurements, relatively simple equations can lead to pressure at another point of the engine. For example, it can be feasible to either directly measure pressure before or after a compressor stage in an aircraft engine, and to determine the pressure of the other, provided other key measurements are also available. Using such principles, it can be relatively straightforward to synthesize pressure inside the combustion chamber using a measurement of pressure acquired immediately upstream of the combustion chamber and factoring in known pressure losses such as those which can be known to occur across the combustion chamber liner, for instance.

Other examples a synthesized parameter value often used in gas turbine engine control are "normalized" values. For instance, altitude may be a good indicator for basing the control of a given controllable engine element, but may be an even better indicator if it is first "tuned" (i.e. increased or decreased to a certain extent) as a function of another parameter, such as engine power for instance. The resulting parameter can in some cases be more complex and cannot be directly equated to a single physical measurable property, and can therefore be referred to as a synthetic parameter.

Referring back to FIGS. 1, 2A and 2B, in one embodiment, a sensor 30 can be associated to a shaft 20, 22 and provide the engine controller 92 with a current value of torque. It was found that in at least some conditions, which can occur between flight idle and mid-takeoff power in some embodiments, shaft shear 36 occurring between the sensor 30 and the turbine 16, the sensor 30 being between the turbine 16 and the greatest source of load 26, 12, can lead to a sudden drop of torque, down to zero or near-zero (e.g. less than 5% vs. max) torque, and that the sudden dropping of the torque could be used to initiate a shear mitigation process. In one embodiment, this can be achieved very quickly, such as below 150 ms, below 100 ms, below 70 ms, or even below 50 ms.

In such an embodiment, a current value of torque can be monitored at a relatively high sampling rate, such as less than 30 ms, less than 20 ms, or less than 10 ms. In other words, new current values of the torque can be generated regularly over time based on the sampling rate. In one embodiment, where the torque sensor 30 is a phonic wheel sensor 30a, the sampling rate can be in the order of 6 ms for instance.

A rate of reduction of torque can be determined 110 in various ways based on the new current values of the torque received over time. In one example, determining rate of reduction of torque can be performed by computing a time derivative of the torque signal. Another example way is by storing the instantaneous values, e.g. in a first in first out manner, by calculating the difference between two of the torque values, and determining the proportion of the difference relative one or more of the torque values. In one embodiment, the time derivative approach can be considered too likely to generate false detections and the difference-based calculation approach can be preferred. The difference-based calculation approach can involve determining the difference between two subsequent torque values, or between two non-subsequent torque values. In one embodiment, the two torque values can be taken at moments in time separated by less 150 ms, less than 100 ms, less than 70 ms, or even less than 50 ms. In one embodiment, a new rate of reduction of torque can be calculated each time a new torque value is available from the sampling.

Figure 4:
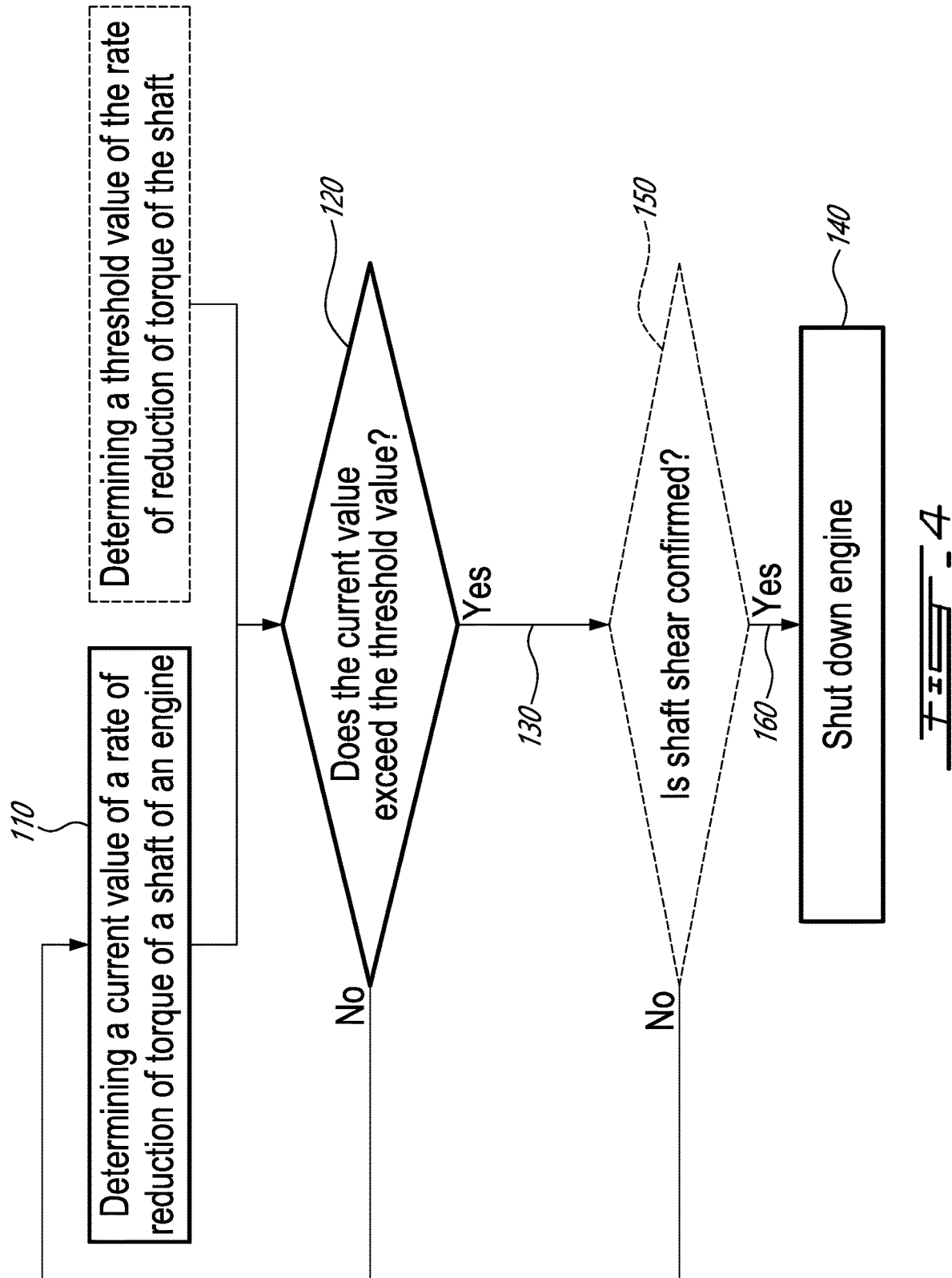
FIG. 4 is a flow chart of a method of detecting shaft shear.

Referring to FIG. 4, the current value of the rate of reduction of torque can be compared 120 to a corresponding threshold value (threshold value for the rate of reduction of torque) to acquire a primary indication 130 of shaft shear. More specifically, a primary indication 130 of shaft shear can be triggered when the current value of the rate of reduction of torque exceeds a maximum rate of reduction expected, the maximum rate of reduction being expressed by the threshold value.

In one embodiment, the threshold value and can take the form of data 52 stored in a computer readable memory accessible to the processor executing the instructions. In one embodiment, the threshold value can be a unique value. In another embodiment, the threshold value can be encoded as a relationship with varying values of one or more other monitored parameters, and dynamically generated as a function of the relationship and of the evolution of such one or more other monitored parameters 54. Indeed, it was found that in a manner to provide a suitable response in some embodiments, the threshold value 58 needed to be adapted as a function of current operating conditions. Such one, or more other monitored parameters 54 can include altitude in some embodiments. Such one, or more other monitored parameters 54 can be selected to be indicative of turbine loading in some embodiments, such as engine power, compressor discharge pressure, turbine temperature, commanded fuel flow rate, measured fuel flow rate, etc., depending on the embodiment.

Figure 5:
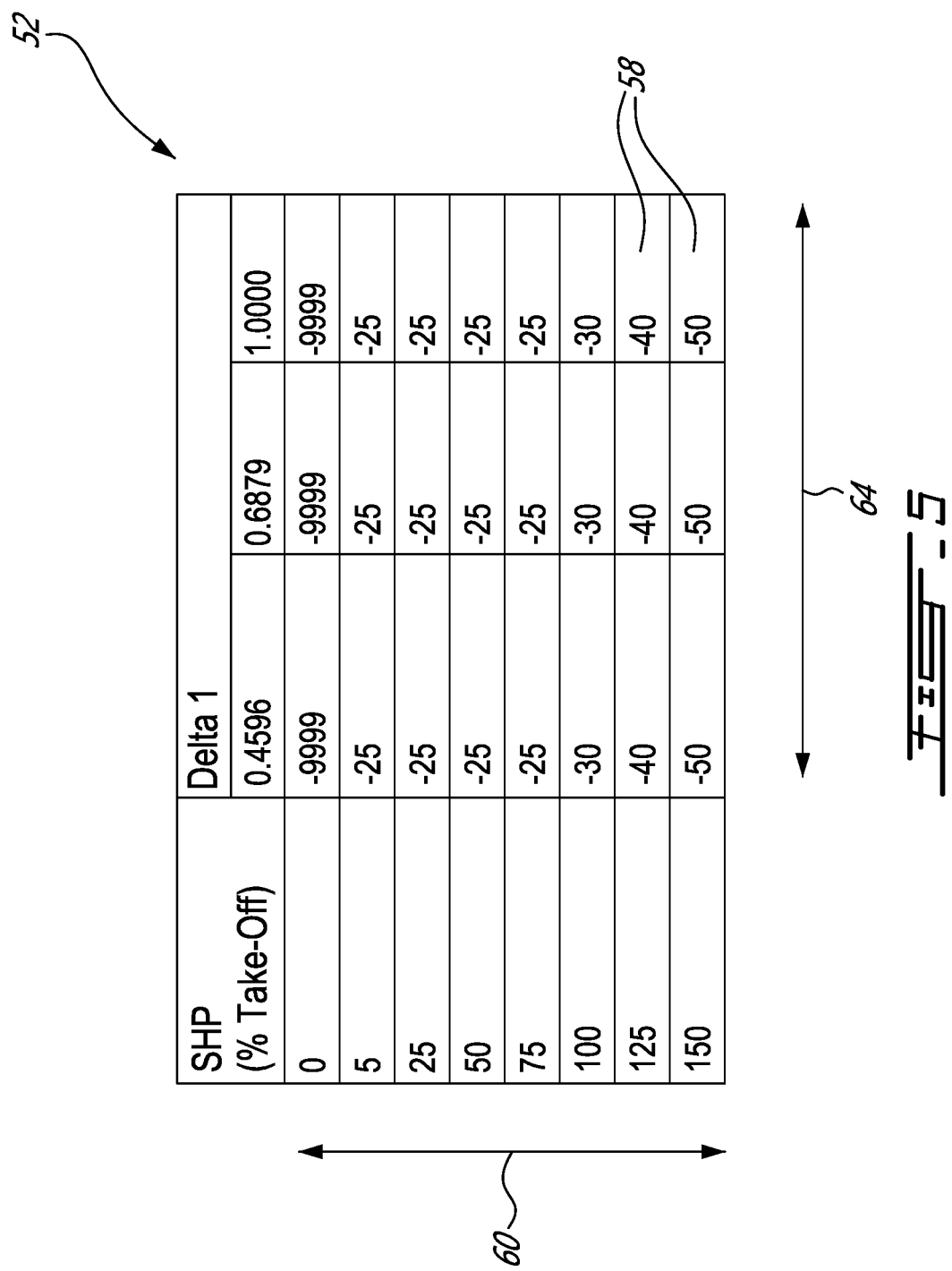
FIG. 5 is a table showing a relationship between a threshold value and other monitored parameters.

In particular, in one embodiment, a relationship which can be referred to as torque threshold data 52 can be encoded in the computer readable memory such as in the form of a 2D, or higher dimension table or other function, and establish a correlation between varying threshold values and varying values of other monitored parameters. An example of torque threshold data 52 adapted for one embodiment is presented in FIG. 5. More specifically, the example torque threshold data 52 presents varying threshold values 58 corresponding to maximum expected torque reduction % over a given period of time which can be in the order of 100 ms for instance, and the threshold values 58 vary both as a function of current engine power 60 and as a function of altitude 64. More specifically, in this specific embodiment, the "altitude" axis 64 of the table actually encodes a synthetic parameter corresponding to altitude normalized as a function of standard day pressure at sea level, e.g. P1/14.697psia, and which is therefore a synthetic monitored parameter referred to as Delta1.

Depending on the embodiment, the period of time serving as a reference for the purpose of determining the torque reduction (say 100 ms in one example), can vary as a function of varying values of one or more monitored parameters instead of being fixed, in a way similar to the way in which the threshold value 58 varied as a function of monitored parameters in the example presented above. This can provide an additional degree of modularity to the control software designer which can be useful in tackling the challenge of achieving a suitably quick reaction time while minimizing the likelihood of false detection.

Depending on the embodiment, in embodiments where the threshold value, and/or the reference period of time for the threshold value, is/are dynamically generated/adjusted, the determination of a new threshold value or new reference period of time can occur within a timeframe similar to the timeframe of the generation of the primary indication of shaft shear, such as below 150 ms for instance, or within a significantly slower timeframe, such as within a timeframe of one second or of seconds, for instance.

Referring back to FIG. 4, in one embodiment, the primary indication of shaft shear can be the sole indication of shaft shear and this indication of shaft shear can serve directly as a trigger for the shutting down 140 of the engine (e.g. via the energy supply). In another embodiment, the primary indication 130 of shaft shear can serve only to initiate the shear mitigation response, and lead to a second step/test, which will be referred to herein as confirmation 150 of the shaft shear, prior to generating the engine shut down 140. More specifically, the shaft shear confirmation step 150 can generate a secondary indication 160 of shaft shear which serves as the trigger for the shutting down of the engine energy supply. Such a second step/test can be useful in some embodiments to satisfactorily reduce the likelihood of false detection. The step of shaft shear confirmation 150 can use a different test than the generation of the primary indication 130 which initiates the shear mitigation response. The details of the shaft shear confirmation step 150, if present at all, can vary from one embodiment to another.

To illustrate the concept, an example will now be provided. In one embodiment, the shaft shear confirmation step 160 can, for instance, evaluate the value of torque acquired immediately after the first step 120 (e.g. ~0.1 s after the shear event) to determine if the torque has fallen down to zero, as would be expected in the event of shaft shear. In practice, this can involve comparing the value of torque to a torque value threshold representing "close to zero" in a language a computer can understand. The value of the torque value threshold can vary from one embodiment to another, such as say 5% of maximum rated torque for a given engine, to name one possible example. In alternate embodiments, the torque threshold can be expressed as a % of torque immediately before the step of initiating 130 the shear mitigation response, to name another possible example.

In such a latter embodiment, the same motivation of achieving a quick response time while minimizing the likelihood of a false indication can exist, and it can be desired for this determination 150 to be made quickly and efficiently. Perhaps the quickest way to perform this step in one embodiment is to use a value of torque which is still in the computer readable memory and which served as a basis of calculating a difference with an earlier value of torque for the purpose of rate of reduction calculation, for instance. Accordingly, the latest value of the two torque values used for the purpose of rate of reduction calculation, as opposed to the earlier one, or a torque value acquired as soon as possible afterwards, can be compared to the torque threshold for the purpose of performing the second step/test, and generating the secondary indication of shear. Accordingly, the value of torque used to perform the second test can have been acquired within 400 ms, within 200 ms, within 50 ms, and even earlier than the generation of the primary indication of shear.

Accordingly, in such an embodiment, generation of a fuel shutoff command 140 can be contingent upon generation of the secondary indication 160 of shaft shear, the latter itself being contingent upon both the primary indication 130 of shaft shear and its dedicated test 150 or conditions, such as presented in FIG. 4. Indeed, in an alternate embodiment, the confirmation can be based on comparing a rate of reduction of speed of the shaft to a rate of reduction of speed threshold for instance.

Alternately, in an embodiment where the primary indication 130 is torque-based, such as the embodiment of FIG. 4, the secondary indication 160 may be based on another monitored parameter than torque.

Depending on the embodiment, the process presented in FIG. 4 can be permanently activated, or selectively activated when certain operating conditions are met. In particular, it will be understood that in an example embodiment such as presented in FIG. 1 where the process can be applied to a low pressure shaft 22 which is connected to a load 24, 26, via a clutch 28, and where the sensor 30 generating the torque value is positioned between the clutch 28 and the turbine 16, unclutching may lead to a confusingly similar reduction in torque than the reduction in torque which could otherwise stem from a shaft shear event, and it can thus be desired to deactivate the process presented in FIG. 4 when unclutching conditions are met, or to set the threshold(s) sufficiently precisely to allow distinguishing such different conditions. There can be different ways by which unclutching conditions can be determined to be met, such as pilot input, or automated detection based on sensor input. In particular, in the example presented in FIG. 4, when engine power is zero, which occurs when the load is unclutched, the torque threshold reaches a value which is impossible to achieve in practice, effectively activating the process. There can be other reasons for which a given shaft shear mitigation method such as the mitigation method presented in FIG. 4 can be considered either useful or undesirable and in some embodiments, a separate software function can be used accordingly to selectively activate or deactivate the given shaft mitigation method based on current values of monitored parameters or inputs. For instance, the shear mitigation method of FIG. 4 can be selectively deactivated when inputs indicative of a ground idle or of an engine startup condition, for instance, and otherwise activated by default, for instance. Numerous variations are possible in alternate embodiments.

In one embodiment, an "unclutched" condition can be based on a sensor configured to directly sense the clutched or unclutched condition. In another embodiment, an "unclutched" condition can be sensed indirectly, such as via a commanded fuel flow, a measured fuel flow and/or fuel flow maps for instance. In still other embodiments, the thresholds can be defined in a manner to passively allow to distinguish between such different engine operation conditions.

Figure 6:
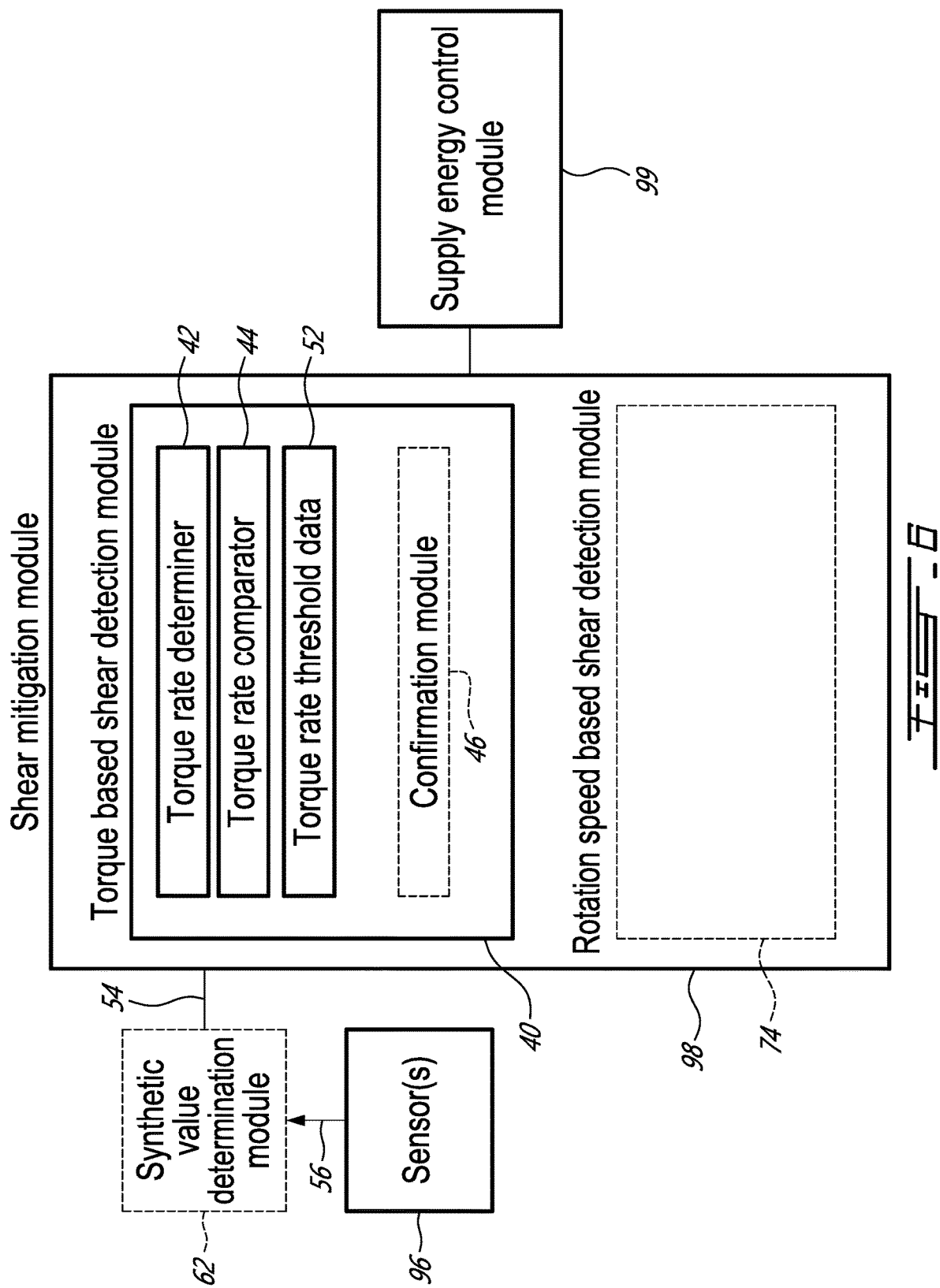
FIG. 6 is a block diagram of a shear mitigation module.

In one embodiment, a torque-based method of shear detection such as presented above can be embodied in the form of a torque-based shear detection module 40 forming part of a shear detection module 98 such as presented in FIG. 6. More specifically, the torque-based shear detection module 98 can include a torque reduction rate determiner 42 function configured for determining the current value of torque reduction rate, torque threshold data 52 which can, in some embodiments, further include a function of determining a torque threshold value based on current operating conditions, and a torque rate comparator 44 for performing a function of comparing the torque reduction rate to the torque threshold value and triggering the preliminary indication of shear based on the comparison. The functions associated to the step of confirmation can be referred to as a confirmation module 46.

In some embodiments, a torque-based method of shear detection such as presented above can be the sole method of shear detection implemented in a given engine. In other embodiments, or in some operating conditions of a given embodiment, a torque-based method of shear detection such as the method presented in FIG. 4 can run in parallel with another one, or even more, methods of detecting shaft shear events. Indeed, more than one shear detection method can operate in parallel, in a manner that engine shutdown can be triggered by any one of the methods in a manner reminiscent of an OR gate logic, and/or be selectively activated or deactivated in different operating conditions in order for more than one method to provide coverage over the entire operating envelope in a fully overlapping, partially overlapping or non-overlapping manner. In one example, for instance, a shaft rotation speed-based method of shear detection which will be detailed below in relation with FIGS. 7, 8 and 9, can operate in parallel with a torque-based method of shear detection, as schematized in FIG. 10. In still other examples, a shaft rotation speed-based method of shear detection such as exemplified in FIGS. 7, 8 and 9 can be the sole method of shear detection implemented on a given engine.

Referring back to FIGS. 1, 2A and 2B, in one embodiment, a sensor 30 can be associated to a shaft 20, 22 and provide the engine controller 92 with a current value of torque. It was found that in at least some conditions, which can occur ground idle and startup power in some embodiments, shaft shear 36 occurring between the sensor 30 and the turbine 16, the sensor 30 being between the turbine 16 and the greatest source of load 26, 12, can lead to a characteristic reduction rate of rotation speed, and that the characteristic rate of reduction of rotation speed could be used to initiate a shear mitigation process. In one embodiment, this can be achieved quickly, such as below 1 s, or below 0.5 s for instance.

In such an embodiment, a current value of rotation speed can be monitored at a relatively high sampling rate, such as less than 200 ms, less than 100 ms, less than 30 ms, less than 20 ms, or less than 10 ms. In other words, new current values of rotation speed can be generated regularly over time based on the sampling rate. In one embodiment, where the rotation speed sensor is a phonic wheel sensor 30a, the sampling rate can be below 6 ms for instance in engine startup or ground idle conditions.

A rate of reduction of speed can be determined 210 in various ways based on the new current values of rotation speed received over time. One example way is by computing a time derivative of the rotation speed signal. Another example way is by storing the instantaneous values, e.g. in a first in first out manner, by calculating the difference between two of the rotation speed values, and determining the proportion of the difference relative one or more of the rotation speed values. In one embodiment, the time derivative approach can be considered too likely to generate false detections and the difference-based calculation approach can be preferred. The difference-based calculation approach can involve determining the difference between two subsequent rotation speed values, or between two non-subsequent rotation speed values. In one embodiment, the two rotation speed values can be taken at moments in time separated by less than 700 ms, less than 500 ms, less than 300 ms, or even less than 200 ms. In one embodiment, a new rate of reduction of rotation speed can be calculated each time a new rotation speed value is available from the sampling.

Referring to FIG. 4, the current value of the rate of reduction of rotation speed can be compared 220 to a corresponding threshold value (threshold value for the rate of reduction of rotation speed) to acquire a primary indication 230 of shaft shear. More specifically, a primary indication 230 of shaft shear can be triggered when the current value of the rate of reduction of rotation speed exceeds a maximum rate of reduction expected, the maximum rate of reduction being expressed by the threshold value. It will be understood in this context that "exceeds" can apply to positive or negative values of thresholds. In particular, in a scenario where the threshold is a negative value (e.g. −15%), a value can be said to exceed the threshold when it is less than the threshold value (e.g. −20%), as can be the case for a rate of reduction for instance.

In one embodiment, the threshold value and can take the form of data 70 stored in a computer readable memory accessible to the processor executing the instructions. In one embodiment, the threshold value can be a unique value. In another embodiment, the threshold value can be encoded as a relationship with varying values of one or more other monitored parameters, and dynamically generated as a function of the relationship and of the evolution of such one or more other monitored parameters 54. Indeed, it was found that in a manner to provide a suitable response in some embodiments, the threshold value 72 needed to be adapted as a function of current operating conditions. Such one, or more other monitored parameters 54 can include altitude in some embodiments. Such one, or more other monitored parameters 54 can be selected to be indicative of turbine loading in some embodiments, such as engine power, compressor discharge pressure, turbine temperature, commanded fuel flow rate, measured fuel flow rate, etc., depending on the embodiment.

In particular, in one embodiment, a relationship which can be referred to as rotation speed threshold data 70 can be encoded in the computer readable memory such as in the form of a 2D, or higher dimension table or other function, and establish a correlation between varying threshold values and varying values of other monitored parameters. An example of rotation speed threshold data 70 adapted for one embodiment is presented in FIG. 8. More specifically, the example rotation speed threshold data 70 presents varying threshold values 72 corresponding to maximum expected rotation speed reduction % over a given period of time which can be in the order of 0.5 s for instance, and the threshold values 72 vary both as a function of current engine power 60 and as a function of altitude 64. More specifically, in this specific embodiment, the "altitude" axis 64 of the table actually encodes a synthetic parameter corresponding to normalized altitude as defined realier in relation with FIG. 5.

Depending on the embodiment, the period of time serving as a reference for the purpose of determining the rotation speed reduction (say 500 ms in one example), can vary as a function of varying values of one or more monitored parameters instead of being fixed, in a way similar to the way in which the threshold value 72 varied as a function of monitored parameters in the example presented above. This can provide an additional degree of modularity to the control software designer which can be useful in tackling the challenge of achieving a suitably quick reaction time while minimizing the likelihood of false detection.

Moreover, in some embodiments, it can be hypothesized that the magnitude of NL decay following a shear event is relatively linearly in function of the NL speed at the time. To this end, rotation speed threshold data 70 can serve as a basis of determining a base current threshold value, and a multiplier, considered to correspond with the linear relationship, can be used to multiply the base current threshold value and yield the current threshold value used for the basis of the determination.

Depending on the embodiment, in embodiments where the threshold value, and/or the reference period of time for the threshold value, is/are dynamically generated/adjusted, the determination of a new threshold value or new reference period of time can occur within a timeframe similar to the timeframe of the generation of the primary indication of shaft shear, such as below 1 s for instance, or within a significantly slower timeframe, such as within a timeframe of several seconds, for instance.

Referring back to FIG. 7, in one embodiment, the primary indication of shaft shear can be the sole indication of shaft shear and this indication of shaft shear can serve directly as a trigger for the shutting down 240 of the engine (e.g. via the energy supply). In another embodiment, the primary indication 230 of shaft shear can serve only to initiate the shear mitigation response, and lead to a second step/test, which will be referred to herein as confirmation 250 of the shaft shear, prior to generating the engine shut down 240. More specifically, the shaft shear confirmation step 250 can generate a secondary indication 260 of shaft shear which serves as the trigger for the shutting down of the engine energy supply. Such a second step/test can be useful in some embodiments to satisfactorily reduce the likelihood of false detection. The step of shaft shear confirmation 250 can use a different test than the generation of the primary indication 230 which initiates the shear mitigation response. The details of the shaft shear confirmation step 250, if present at all, can vary from one embodiment to another.

To illustrate the concept, an example will now be provided. In one embodiment, the shaft shear confirmation step 260 can, for instance, evaluate the value of rate of decrease of rotation speed acquired immediately after the first step 220 (e.g. ~0.5 s after the shear event) to determine if the rate of decrease of rotation speed continues to be significant, as would be expected in the event of shaft shear. In practice, this can involve comparing the value of rate of decrease of rotation speed to a second, independently set, rate of decrease of rotation speed value threshold representing "significant" in a language a computer can understand. Such a second rate of decrease of rotation speed threshold value can vary from one embodiment to another, such as say 0.2%/second, to name one possible example. In alternate embodiments, the rate of speed reduction threshold can be expressed as a % of rate of speed reduction immediately before the step of initiating 230 the shear mitigation response, to name another possible example.

In an alternate embodiment, another technique can be used to effectuate the confirmation step, if a confirmation step is present. For instance, acquiring a confirmation that the engine is clutched either directly by a clutch sensor or indirectly based on commanded or measured fuel flow for instance, may serve as a confirmation that the reduction in speed is associated to shaft shear as opposed to shaft unclutching.

Figure 7:
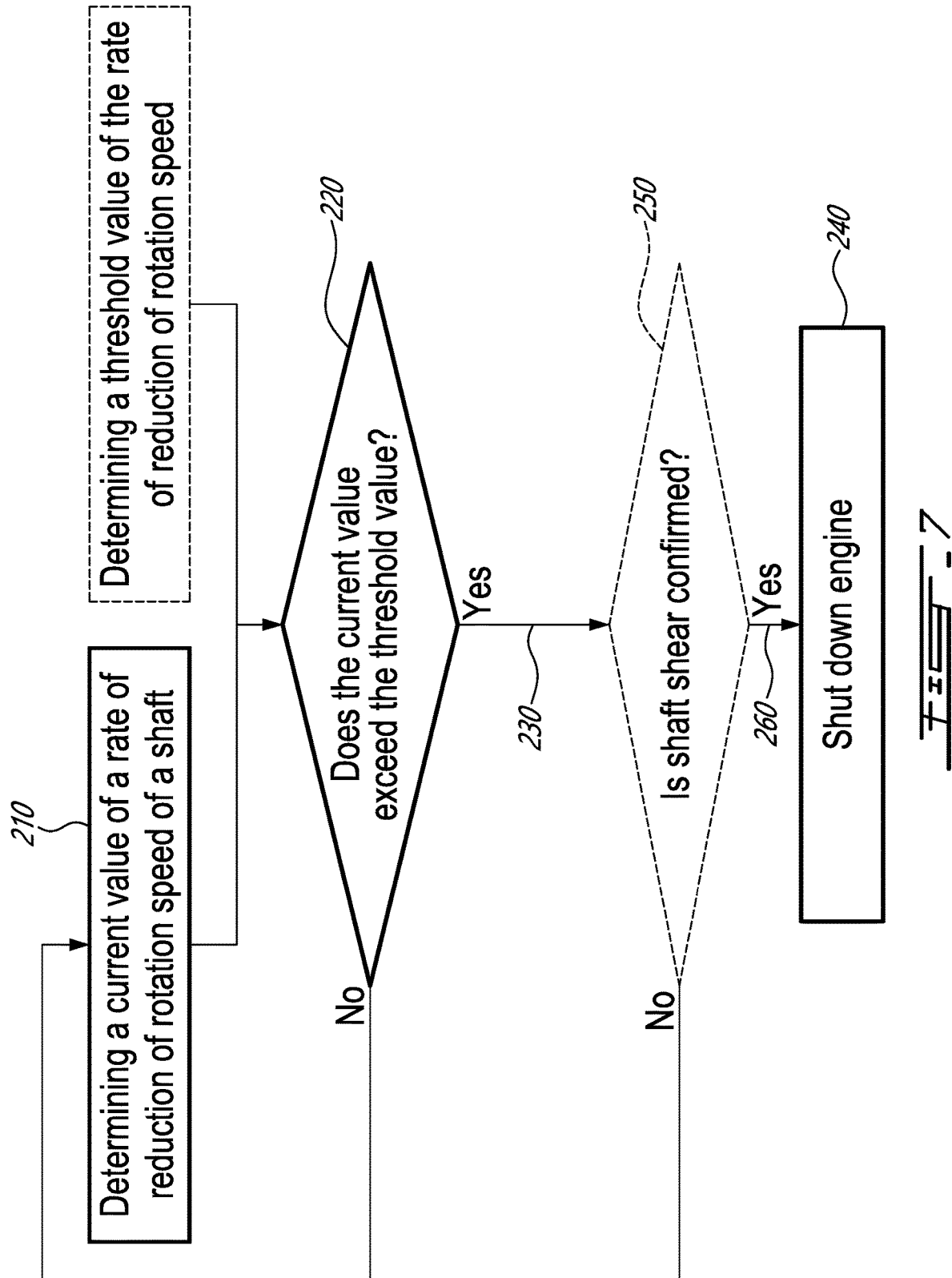
FIG. 7 is a flow chart of a method of detecting shaft shear.

Accordingly, in such an embodiment, generation of a fuel shutoff command 240 can be contingent upon generation of the secondary indication 260 of shaft shear, the latter itself being contingent upon both the primary indication 230 of shaft shear and its dedicated test 250 or conditions, such as presented in FIG. 7.

Alternately, in an embodiment where the primary indication 230 is rotation speed-based, such as the embodiment of FIG. 7, the secondary indication 260 may be based on another monitored parameter than rotation speed.

Depending on the embodiment, the process presented in FIG. 7 can be permanently activated, or selectively activated when certain operating conditions are met. In particular, it will be understood that in an example embodiment such as presented in FIG. 1 where the process can be applied to a low pressure shaft 22 which is connected to a load 24, 26, via a clutch 28, and where the sensor 30 generating the rotation speed value is positioned between the clutch 28 and the turbine 16, unclutching may lead to a confusingly similar reduction in rotation speed than the reduction in rotation speed which could otherwise stem from a shaft shear event, and it can thus be desired to deactivate the process presented in FIG. 7 when unclutching conditions are met. There can be different ways by which unclutching conditions can be determined to be met, such as pilot input, or automated detection based on sensor input. There can be other reasons for which a given shaft shear mitigation method such as the mitigation method presented in FIG. 7 can be considered either useful or undesirable and in some embodiments, a separate software function can be used accordingly to selectively activate or deactivate the given shaft shear mitigation method based on current values of monitored parameters or inputs. For instance, the shear mitigation method of FIG. 7 can be selectively deactivated when inputs indicative of a fly idle, low takeoff, or mid-takeoff condition, for instance, and otherwise activated by default, for instance. Numerous variations are possible in alternate embodiments.

In particular, in an embodiment such as schematized in FIG. 1, the rotation speed reduction sensed by the sensor 30 can be expected to be different in i) a scenario of shaft shear between the compressor 12 and the turbine 16 and ii) an unclutching scenario. Indeed, in an unclutching scenario, the turbine continues to drive compressor in this context, and the compressor thus continues to represent a load, whereas in the shaft shear event, the turbine no longer drives the compressor and the compressor no longer represents a load. These two distinct scenarios can be simulated for a given engine design, and by tuning the speed reduction rate threshold sufficiently tightly, potentially using the multiplier and/or a relationship with one or more other monitored parameters, one can enable the speed-based method of shear detection to single out a shaft shear event from a potential unclutching scenario.

Figure 8:
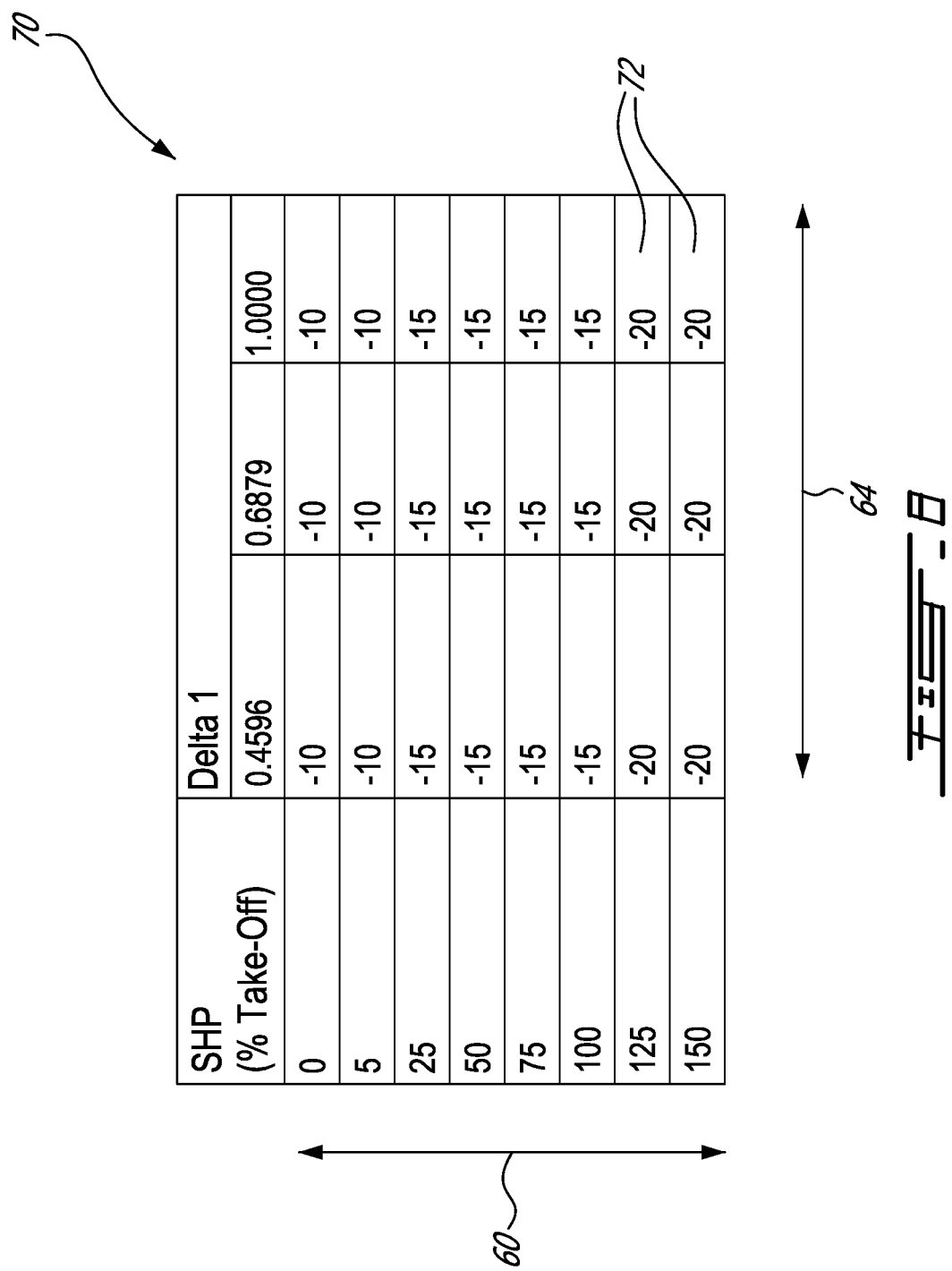
FIG. 8 is a table showing a relationship between a threshold value and other monitored parameters.

In one embodiment, a rotation speed-based method of shear detection such as presented above can be embodied in the form of a rotation speed-based shear detection module 74 forming part of a shear detection module 98 such as presented in FIG. 8. More specifically, the rotation speed-based shear detection module 98 can include a rotation speed reduction rate determiner 76 function configured for determining the current value of rotation speed reduction rate, rotation speed threshold data 70 which can, in some embodiments, further include a function of determining a rotation speed threshold value based on current operating conditions and potentially also of multiplying by a factor indicative of speed, and a rotation speed rate comparator 78 for performing a function of comparing the rotation speed reduction rate to the rotation speed threshold value and triggering the preliminary indication 230 of shear based on the comparison. The functions associated to the step of confirmation can be referred to as a confirmation module 80.

In some embodiments, a rotation speed-based method of shear detection such as presented above can be the sole method of shear detection implemented in a given engine. In other embodiments, or in some operating conditions of a given embodiment, a rotation speed-based method of shear detection such as the method presented in FIG. 4 can run in parallel with an other one, or even more, methods of detecting shaft shear events. Indeed, more than one shear detection method can operate in parallel, in a manner that engine shutdown can be triggered by any one of the methods in a manner reminiscent of an OR gate logic, and/or be selectively activated or deactivated in different operating conditions in order for more than one method to provide coverage over the entire operating envelope in a fully overlapping, partially overlapping or non-overlapping manner. In one example, for instance, a shaft rotation speed-based method of shear detection which will be detailed below in relation with FIGS. 7, 8 and 9, can operate in parallel with a torque-based method of shear detection, as schematized in FIG. 10. In still other examples, a torque-based method of shear detection such as exemplified in FIGS. 4, 5 and 6 can be the sole method of shear detection implemented on a given engine.

In one embodiment, a sensor 30 can be associated to the shaft and provide the engine controller both with a current value of torque and a current value of speed. This is typically the case for a phonic wheel sensor 30a for instance, sometimes referred to as a phase shift system.

In such a phonic wheel sensor 30a, two concentric, axially interspaced, toothed wheels, which can be referred to as phonic wheels, can be present concentric and along the length of the shaft, with each toothed wheel having a dedicated set of circumferentially interspaced teeth 84, 86, such as illustrated in FIG. 11.

A magnetic pickup probe can be placed in close proximity to these wheels, and electrical pulses can be generated as each tooth passes the probe. As the shaft spins, both of these phonic wheels will spin at the same rotational speed, providing a redundant rotational speed reading. Moreover, once torque is applied, one of the phonic wheels will rotate or 'twist' in relation to the other phonic wheel in a manner which is roughly proportional to the amount of torque.

As the teeth rotate by the magnetic pickup probe, electrical pulses are generated and fed to the engine controller.

The high peaks of the voltage wave presented in FIG. 11 can correspond to a tooth directly below the probe. The engine controller, e.g. such as via a synthetic value determination module, can receive these signals and as the signal crosses a 'zero voltage' line, start and stop certain counters. These counters represent time between certain tooth pairings, based on which the torque can be calculated.

It will be understood that while a phonic wheel sensor 30*a* can be suitable in some embodiments, it may be inconvenient or unavailable in other embodiments, and other embodiments may use different types of sensors for sensing torque and/or speed. For instance, a cavity pressure system can be used in some embodiments, but a phonic wheel sensor 30*a* can be preferred, especially for torque determination, given the potentially quick response/sampling rate.

Referring to FIG. 12, it will be understood that the expression "computer", controller, or module 400 as used herein is not to be interpreted in a limiting manner. It is rather used in a broad sense to generally refer to the combination of some form of one or more processing units 412 and some form of memory system 414 accessible by the processing unit(s). The memory system can be of the non-transitory type. The use of the expression "computer", controller or module in its singular form as used herein includes within its scope the combination of a two or more computers working collaboratively to perform a given function. Moreover, the expression "computer" as used herein includes within its scope the use of partial capabilities of a given processing unit.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), an electronic engine controller EEC, a full authority digital engine controller (FADEC), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer, can have one or more input/output (I/O) interface to allow communication with a human user and/or with another computer via an associated input, output, or input/output device such as a keyboard, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while a gas turbine engine is used in FIG. 1 to provide an example, it will be understood that a method of determining shear such as presented herein can be applied to other engine types in some embodiments, such as electric engines, hybrid heat/electric engines or hybrid fuel (e.g. kerosene/hydrogen) engines. Yet further modifications could be implemented by a person of ordinary skill in the art in view of the present disclosure, which modifications would be within the scope of the present technology.

The invention claimed is:

1. A method of detecting a shaft shear event occurring at a shaft of an engine, the method comprising:
during operation of the engine, at an engine controller:
monitoring a current value of a rate of reduction of torque of the shaft;
providing a threshold value for the rate of reduction of torque of the shaft;
generating a signal indicative of the shaft shear event when the current value exceeds the threshold value.

2. The method of claim 1 wherein said monitoring the current value includes receiving a plurality of values of the torque over time, at a sampling rate below 30 ms, and determining the current value of the rate of reduction of torque based on the plurality of values of the torque.

3. The method of claim 2 wherein the sampling rate is below 10 ms.

4. The method of claim 2 wherein said determining the current value of the rate of reduction includes determining a difference between two of the plurality of values of the torque and determining the proportion between the difference and at least one of said values of the torque.

5. The method of claim 4 wherein the two of the plurality of values of the torque are within a timespan below 150 ms.

6. The method of claim 2 wherein said determining the current value of the rate of reduction includes determining the current value of the rate of reduction for each sampled value of torque.

7. The method of claim 2 including receiving the plurality of values of the torque over time from a phonic wheel sensor coupled to the shaft.

8. The method of claim 7 wherein the shaft is a low pressure shaft having a turbine, a compressor, and an output end opposite the turbine, the phonic wheel sensor being positioned along a length of the low pressure shaft between the compressor and the output end.

9. The method of claim 1 wherein said providing a threshold value includes monitoring operating conditions of the engine and determining a current threshold value based on the current operating conditions, wherein said signal indicative of the shaft shear event is generated when the current value of the rate of reduction of torque exceeds the current threshold value.

10. The method of claim 9 wherein the monitoring operating conditions includes monitoring a current value of at least one monitored parameter indicative of a turbine load, and determining a current threshold value includes selecting a current threshold value based on a relationship between different threshold values and different values of said at least one monitored parameter indicative of the turbine load, said relationship being stored in a non-transitory memory of the engine controller.

11. The method of claim 10 wherein said at least one monitored parameter indicative of the turbine load includes engine power.

12. The method of claim 11 wherein said at least one monitored parameter indicative of the turbine load further includes altitude.

13. The method of claim 1 further comprising determining whether said shaft shear event is confirmed when the signal indicative of shaft shear is generated.

14. The method of claim 13 wherein said determining whether said shaft shear event is confirmed includes determining a current value of torque when the signal indicative of shaft shear is generated, comparing said current value of torque to a torque threshold value, and determining that the shaft shear event is confirmed when the current value of torque is below the torque threshold value.

15. The method of claim 14 wherein said current value of torque is acquired within 50 ms of said generating a signal indicative of shaft shear.

16. The method of claim 1 further comprising, during operation of the engine, at the engine controller: in parallel with said monitoring, providing, and generating, performing an other method of detecting a shaft shear event, said other method including monitoring a current value of a parameter other than a rate of reduction of torque of the shaft, wherein said signal indicative of the shaft shear event is generated when at least one of
  the current value of the rate of reduction of torque exceeds the threshold value for the rate of reduction of torque, and
  the current value of the parameter other than the rate of reduction of torque exceeds a threshold value for the parameter other than the rate of reduction of torque.

17. The method of claim 16 wherein the parameter other than the rate of reduction of torque is a rate of reduction of a rotation speed of the shaft.

18. The method of claim 1 further comprising, during operation of the engine, at the engine controller: cutting a fuel supply to the engine when the signal indicative of the shaft shear event is generated.

19. The method of claim 1 further comprising monitoring operating conditions of the engine, and deactivating the method of detecting a shaft shear event when operating conditions correspond to at least one of ground idle and engine startup.

20. The method of claim 1 further comprising monitoring operating conditions of the engine, and deactivating the method of detecting a shaft shear event when a load of the engine is unclutched from the shaft.

* * * * *